(12) United States Patent
Pfeiffer

(10) Patent No.: US 6,764,253 B1
(45) Date of Patent: Jul. 20, 2004

(54) SYSTEM AND METHOD FOR ASSURING FLUIDIZATION OF A MATERIAL TRANSPORTED IN A PNEUMATIC CONVEYING SYSTEM

(75) Inventor: John W. Pfeiffer, Hughesville, PA (US)

(73) Assignee: The Young Industries, Inc., Muncy, PA (US)

( * ) Notice: Subject to any disclaimer, the term of this patent is extended or adjusted under 35 U.S.C. 154(b) by 0 days.

(21) Appl. No.: 10/366,376

(22) Filed: Feb. 14, 2003

(51) Int. Cl.[7] .............................................. B65G 51/16
(52) U.S. Cl. .............................. 406/11; 406/89; 406/95
(58) Field of Search ............................... 406/11, 89, 95

(56) References Cited

U.S. PATENT DOCUMENTS

| | | | | |
|---|---|---|---|---|
| 4,515,503 A | * | 5/1985 | Snowdon | 406/11 |
| 4,909,676 A | * | 3/1990 | Heep et al. | 406/14 |
| 5,071,289 A | * | 12/1991 | Spivak | 406/11 |
| 5,584,612 A | * | 12/1996 | Nolan | 406/11 |

* cited by examiner

Primary Examiner—Joe Dillon, Jr.
(74) Attorney, Agent, or Firm—Stevens, Davis, Miller & Mosher, LLP

(57) ABSTRACT

In a system for pneumatically conveying a bulk particulate material including a first conduit formed of a gas permeable material, a second conduit formed of an impermeable material encompassing and spaced from the first conduit, a plurality of partition walls disposed between said conduits and spaced along the lengths thereof providing a plurality of plenums, means connectable to a first source of gas under pressure for injecting a gas under pressure into said first conduit to impel material deposited therein and second means connectable to a second source of gas under pressure for supplying gas under pressure into said plenums to fluidize material flowing through the first conduit, a system for declogging the second conduit consisting of means connected to a source of gas under pressure operable for selectively supplying the plenums with bursts of gas under pressure for dislodging material deposited in said apertures of the first conduit.

19 Claims, 1 Drawing Sheet

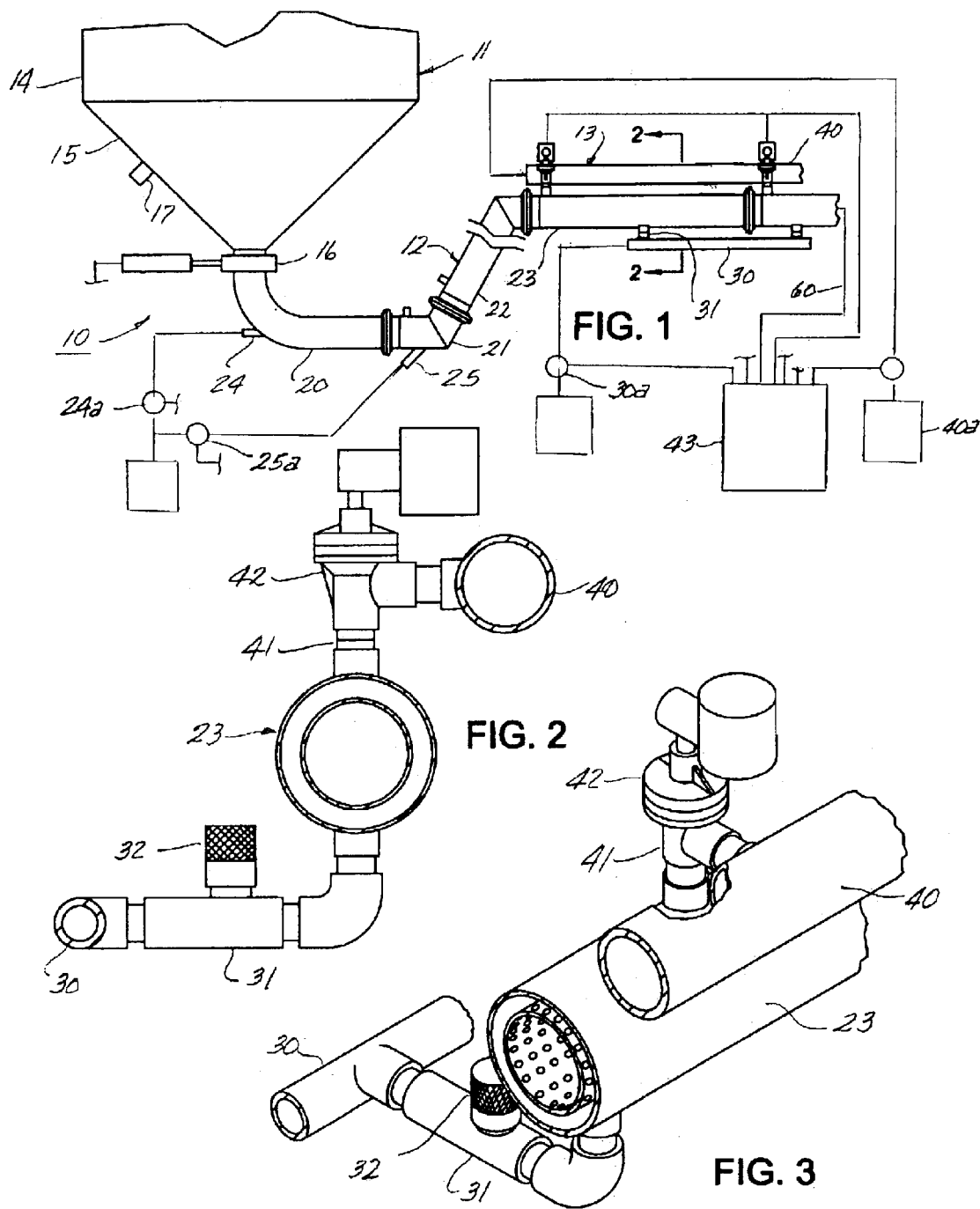

SYSTEM AND METHOD FOR ASSURING FLUIDIZATION OF A MATERIAL TRANSPORTED IN A PNEUMATIC CONVEYING SYSTEM

This invention relates to a declogging system and more particularly to a system for assuring the fluidization of material conveyed in a pneumatic conveying system.

BACKGROUND OF THE INVENTION

In the prior art, there has been developed a system for pneumatically conveying a bulk particulate material generally consisting of a first conduit formed of a gas permeable material having an inlet and an outlet, a second conduit formed of an impermeable material encompassing and spaced from the first conduit, a plurality of partition walls disposed between such conduits and spaced along the lengths thereof, providing a plurality of plenums, means connectable to a source of gas under pressure for injecting a gas into the first conduit to impel material deposited therein and means for supplying such plenums with a supply of gas under pressure which has the effect of permeating the interior, permeable conduit, forming a boundary layer consisting of air and entrained material being conveyed and thus enhancing the flowability of material being conveyed. Such a system is illustrated and described in U.S. patent applications, Ser. No. 09/883,486, filed Jun. 18, 2001, now U.S. Pat. No. 6,609,871, and Ser. No. 10/223,381, filed Aug. 20, 2002, which are incorporated herein by reference.

In the type of system as described, following a period of use in service, it has been found that some materials being conveyed have the tendency to accumulate on the inner surface of the inner, permeable conduit, forming a crust which over a period of time begins to clog the openings in such conduit. With encrustation, the fluidization efficiency is impaired by the clogging of the pores in the permeable conduit, which increases the pressure drop across the conduit and correspondingly reduces the flow rate of fluidizing gas. Encrustation also reduces the cross-sectional area of the conveying line, which correspondingly increases the resistance to conveying flow. Accordingly, it is the principal object of the present invention to provide a system complimentary to the type of system as described for preventing such encrustation and assuring the supply of fluidizing gas and correspondingly minimizing if not eliminating the pressure drop along such a conveying line.

SUMMARY OF THE INVENTION

The present invention obviates the potential problem of clogging of the apertures in the inner, permeable conduit in a system of the type described, and the attendant pressure drop along the conveying line by providing a complimentary system including means connected to an additional source of gas under pressure operable for selectively supplying the plenums of the conveying line with bursts of gas under pressure for dislodging material clogging the apertures in the inner, permeable conduit of the conveying system. Preferably, such complimentary system is operable to periodically supply such bursts of gas progressively to such plenums along the length of the conveying line.

BRIEF DESCRIPTION OF THE DRAWINGS

FIG. 1 is a side elevational view of a system for pneumatically conveying a bulk particulate material, embodying the present invention, having portions thereof broken away and other portions thereof depicted schematically.

FIG. 2 is an enlarged, cross-sectional view taken along line 2—2 in FIG. 1; and

FIG. 3 is a perspective view of a portion of the system shown in FIG. 2.

DETAILED DESCRIPTION OF AN EMBODIMENT OF THE INVENTION

Referring to the drawing, there is illustrated a system 10 for pneumatically conveying a bulk particulate material which generally includes a vessel 11, a pneumatic conveying line 12 and a declogging system 13. Vessel 11 is of a conventional construction, intended to hold a mass of material to be conveyed, and generally includes an upper, cylindrical body portion 14, a lower hopper section 15 and a control valve 16 provided at the lower, discharge end of the hopper. The interior of the hopper may be provided with a frusto-conically configured, permeable wall member spaced from the hopper wall to provide an annular chamber. Air under pressure may be supplied to such annular chamber through a fixture 17, which is caused to permeate through the permeable wall member to fluidize material in the hopper and thus enhance the flowability of the material flowing through the hopper and control valve 16, into the conveying line.

Pneumatic conveying line 12 consists of a number of sections including an inlet section 20, a pair of transition sections 21 and 22, one or more linear sections 23 and an outlet section (not shown), connected together in end-to-end relation to form the material transport line. Each of such sections includes an inner, permeable conduit forming a material flow passageway, an outer, impermeable conduit spaced from the inner conduit and a pair of annular end walls between such permeable and impermeable conduits, forming a plurality of plenums along the material transport line. Inlet section 20 is connected to control valve 16 for receiving gravity fed material from the vessel when the valve is opened. Material fed into inlet section 20 is impelled through the flow passageway of the transport line by means of a high pressure gas injected into such passageway by a nozzle 24 mounted in section 20 and connected to a source of gas under pressure. Additional nozzles such as nozzle 25 also may be provided in the material transport line for assisting in the flow of material therein, particularly at points along the transport line where the direction of flow of material occurs as in transition sections.

To enhance the flowability of the material in the flow passageway of the transport line, air under pressure is supplied to the plenums of the line sections by means of a gas supply line 30 having branch lines 31 communicating with the plenums of the line sections. Provided in each of branch lines 31 is a manually adjustable flow control needle valve 32. Gas introduced into the plenums of the line sections flows through the inner, permeable conduits of the sections to form a boundary layer consisting of fluidizing gas and entrained particles of material being conveyed, to enhance the flowability of the material being conveyed. Greater details of the construction and operation of such a material transport line are described in the aforementioned U.S. Patent Applications.

Declogging system 13 includes a fluid supply line 40 connected to a source 40a of gas under pressure and a plurality of branch lines 41 each intercommunicating supply line 13 and a section of the transport line. A solenoid operated, quick opening diaphragm valve 42 is provided in each of the branch lines. Such valves are electrically operated by a programmable controller 43 which functions periodically to progressively, quickly open and close valves 42 along the length of the transport line to progressively inject bursts of high pressure gas into the sections of the transport line to dislodge any material clogging the apertures in the inner, permeable conduits of the transport line.

Controller 43 may be programmed to perform a number of functions including operating valve 16 to allow material to be gravity fed from the vessel into the transport line, supply fluidizing air to the hopper to facilitate the flow of material from the hopper into the transport line, operate suitable valves 24a and 25a for injecting high pressure gas through nozzles 24 and 25 to impel the material through the passageway in the transport line, operate a valve 30a to supply fluidizing air to each of the plenums of the sections of the transport line and operate still other valves to periodically supply bursts of high pressure gas progressively to the sections of the transport line to unclog the inner, permeable conduits of such sections.

In the operation of the system as described, a bulk particulate material deposited in vessel 11 may be pneumatically conveyed through transport line 12 by operating suitably programmed controller 43 to energize and deenergize various solenoid operated valves to cause gas under high pressure to be injected into the material transport line through nozzles 24 and 25 to impel material gravity fed from the vessel through the transport line, inject a gas under pressure through fixture 17 into the hopper to fluidize the material being fed into the transport line, thus enhancing its flowability and supplying fluidizing gas through gas supply conduit 30 into the plenums of the sections of the transport line and through the inner, permeable conduits thereof to form a boundary layer of a gas and particle mixture to enhance the flowability of material through the transport line. Periodically, as the material flowing through the transport line begins to clog the openings in the inner, permeable conduits of the transport line, resulting in a pressure drop along the transport line, the controller will function to quickly open and close valves 42 along the length of the transport line to inject bursts of high pressure gas into the section of the transport line to unclog the inner, permeable conduits thereof.

Generally, the pressure injected into the transport line through nozzles 24 and 25 would be in the range of 15 to 100 psig, the pressure of the fluidizing gas injected into the hopper and various sections of the transport line would be less than such pressure range and the pressure of the gas injected into the transport line through the declogging system would be within the 15 to 100psig pressure range. A constant pressure of fluidizing gas may be supplied to each of the plenums of the transport line sections or pressure regulating valves or orifices of different sizes may be provided in branch lines 31 of the fluidizing gas supply system to vary or progressively diminish the pressure of fluidizing gas supplied to the transport line along its length. The valves supplying bursts of high pressure gas into the sections of the transport line may be operated periodically, automatically, at random or in response to a certain pressure drop along the transport line detected by conventional pressure sensors operatively connected to the controller as at 60.

The short pulse duration of valves 42 and the resistance of needle valves 32 normally may be relied upon to dampen the flow of high pressure unclogging gas into fluidizing gas supply line 30. Alternatively, a check valve may be installed in each of branch lines 31 to prevent the backflow of high pressure gas into supply line 30 when valves 42 are opened.

From the foregoing detailed description, it will be evident that there are a number of changes, adaptations and modifications of the present invention which come within the province of those having ordinary skill in the art to which the aforementioned invention pertains. However, it is intended that all such variations not departing from the spirit of the invention be considered as within the scope thereof, limited solely by the appended claims.

I claim:

1. In a system for pneumatically conveying a bulk particulate material including a first conduit formed of a gas permeable material, a second conduit formed of an impermeable material encompassing and spaced from said first conduit, a plurality of partition walls disposed between said conduits and spaced along the lengths thereof providing a plurality of plenums, means connectable to a first source of gas under pressure for injecting gas under pressure into said first conduit to impel material deposited therein and second means connectable to a second source of gas under pressure for supplying gas under pressure into said plenums to fluidize material flowing through said first conduit, a system for declogging said first conduit comprising means connected to a source of gas under pressure operable for selectively supplying bursts of gas under pressure to said plenums for dislodging material deposited on said first conduit.

2. A system according to claim 1 wherein the pressure supplied to said plenums in bursts is greater than the pressure of said fluidizing gases.

3. A system according to claim 1 including means operable to supply said bursts of gas periodically.

4. A system according to claim 1 including means operable to supply said bursts of gas progressively to said plenums along said second conduit.

5. A system according to claim 1 including means operable for injecting said bursts of gas under pressure progressively to said plenums along said second conduit, periodically.

6. A system according to claim 1 including a third conduit connected to a source of gas under pressure;

a plurality of branch lines each interconnecting said third conduit and one of said plenums;

a solenoid operated valve disposed in each of said branch lines; and a controller for operating said valves.

7. A system according to claim 6 wherein each of said valves comprises a diaphragm valve.

8. A system according to claim 6 wherein the pressure of said source of pressure connected to said third line is greater than the pressures of said material impelling and fluidizing gases.

9. A system according to claim 6 wherein each of said valves is operable upon actuation to open momentarily to provide a short burst of high pressure gas.

10. A system according to claim 6 wherein said controller is operable to actuate said valves periodically.

11. A system according to claim 6 wherein said controller is operable to actuate said valves progressively along the length of said second conduit.

12. A system according to claim 6 wherein said controller is operable to actuate said valves progressively along the length of said second conduit, periodically.

13. A method of maintaining the fluidity of a bulk particulate material conveyed through a system including a first conduit formed of a gas permeable material, a second conduit formed of an impermeable material encompassing and spaced from said first conduit, a plurality of partition walls disposed between said conduits and spaced along the lengths thereof providing a plurality of plenums, means connectable to a first source of gas under pressure for injecting gas under pressure into said first conduit to impel material deposited therein and second means connectable to a second source of gas under pressure for supplying gas under pressure into said plenums to fluidize material flowing through said first conduit, comprising injecting bursts of a gas under pressure into each of said plenums.

14. A method according to claim 13 wherein said gas injected into said plenums is at a pressure higher than the pressure of said fluidizing pressures.

15. A method according to claim 13 including injecting said bursts of gas into said plenums, periodically.

16. A method according to claim 13 including injecting said bursts of gas into said plenums progressively along the length of said second conduit.

17. A method according to claim 13 including injecting said bursts of gas into said plenums progressively along the length of said second conduit, periodically.

18. A method according to claim 13 including:
sensing a certain pressure drop along the length of said system; and
injecting said bursts of high pressure gas into said plenums responsive to said pressure drop.

19. A system according to claim 1 including means for sensing a certain pressure drop along the length of said first conduit and wherein said means for selectively supplying said plenums with bursts of gas under pressure are operable responsive to said pressure drop.

* * * * *

UNITED STATES PATENT AND TRADEMARK OFFICE
CERTIFICATE OF CORRECTION

PATENT NO. : 6,764,253 B1
DATED : July 20, 2004
INVENTOR(S) : John W. Pfeifer

Page 1 of 1

It is certified that error appears in the above-identified patent and that said Letters Patent is hereby corrected as shown below:

Drawings,
Please replace the existing drawings with the following:

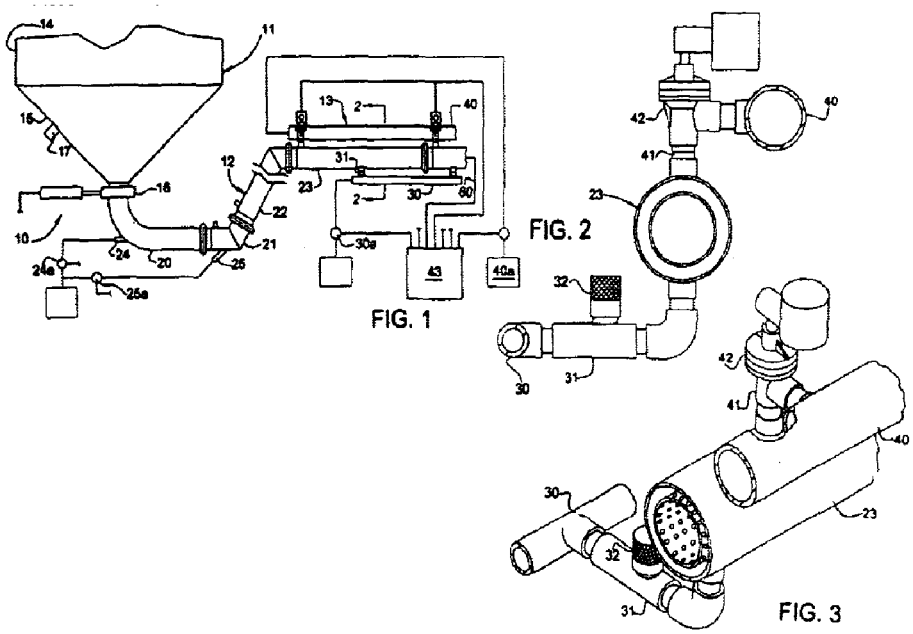

Signed and Sealed this

Fifteenth Day of February, 2005

JON W. DUDAS
*Director of the United States Patent and Trademark Office*